United States Patent [19]

Welna

[11] Patent Number: 5,578,671
[45] Date of Patent: Nov. 26, 1996

[54] INTUMESCENT PUTTY

[75] Inventor: Walton W. Welna, Woodbury, Minn.

[73] Assignee: Minnesota Mining and Manufacturing Company, St. Paul, Minn.

[21] Appl. No.: 567,956

[22] Filed: Dec. 6, 1995

Related U.S. Application Data

[63] Continuation-in-part of Ser. No. 366,959, Dec. 30, 1994, abandoned.

[51] Int. Cl.$^6$ ..................................................... C08K 3/34
[52] U.S. Cl. ........................ 524/443; 524/405; 524/574; 524/575
[58] Field of Search .................................. 524/443, 405, 524/574, 575

[56] References Cited

U.S. PATENT DOCUMENTS

| | | |
|---|---|---|
| 4,189,619 | 2/1980 | Pedlow . |
| 4,266,039 | 5/1981 | Hons-Oliver et al. . |
| 4,273,879 | 6/1981 | Langer et al. . |
| 4,324,835 | 4/1982 | Keen . |
| 4,521,333 | 6/1985 | Graham et al. . |
| 4,529,467 | 7/1985 | Ward et al. . |
| 4,588,523 | 5/1986 | Tashlick et al. . |
| 4,599,369 | 7/1986 | Malcolm-Brown . |
| 4,945,015 | 7/1990 | Milner et al. . |
| 4,952,615 | 8/1990 | Welna . |
| 5,025,058 | 6/1991 | Senoo . |
| 5,059,637 | 10/1991 | Langer . |
| 5,173,960 | 12/1992 | Dickinson . |
| 5,175,197 | 12/1992 | Gestner et al. ........................ 523/218 |

FOREIGN PATENT DOCUMENTS

| | | |
|---|---|---|
| 57-209980 | 12/1982 | Japan . |
| 11-035895 | 5/1989 | Japan . |
| 2092599 | 8/1982 | United Kingdom . |

OTHER PUBLICATIONS

"Standard Test Methods for Cone Penetration of Lubricating Grease Using One–Quarter and One–Half Scale Cone Equipment$^1$" *An American National Standard*, D 1403–91, pp. 483–489, 1991.

"Standard Test Methods for Fire Test of Building Construction and Materials$^1$" *An American National Standard*, E–119–88$^{e1}$ pp. 326–336, 1988.

"Standard Test Method for Fire Tests of Through–Penetration Fire Stops$^1$" *An American National Standard*, E–814–88$^{e1}$ pp. 695–703, 1988.

Product Brochure entitled "Cafco TPS", Isolatek International, Stanhope, NJ.

Product Brochure entitled "Nelson Fire Stop Products", Nelson Fire Stop Products, Tulsa, OK. Dated: Oct. 1993.

Product Brochure entitled "Flame Stop V", Flame Stop Inc. of Fort Worth, TX. Dated: Jul. 10, 1985.

Product Brochure entitled "System–B780 Fire Stop Putty", Nullfire, Ltd., of Coventry, England. Dated: 1993.

Product Brochure entitled "FSP 1000 Firestop Putty", International Protective Coatings Coop of Ocean Twp, NJ. Dated: 1991.

Product Brochure entitled "Firestop Putty", Specified Technologies, Inc. of Somerville, NJ. Dated: Jul. 1993.

Product Brochure entitled "The Art & Science of Firestopping", Specified Technologies, Inc. of Somerville, NJ. Dated: 1993.

Product Brochure entitled "Tremstop Intumescent Flowable Putty", Tremco of Toronto, Ontario. Dated: Jun. 1993.

*Primary Examiner*—Jeffrey T. Smith
*Attorney, Agent, or Firm*—Gary L. Griswold; Walter N. Kirn; Gregory D. Allen

[57] ABSTRACT

This invention relates to non-aqueous, indefinitely conformable, halogen free, intumescent putty useful in an opening as a firestop material to deter the spread of fire, smoke, and vapors during a fire.

30 Claims, No Drawings

INTUMESCENT PUTTY

This application is a continuation-in-part of U.S. Ser. No. 08/366,959, filed Dec. 30, 1994 now abandoned.

FIELD OF THE INVENTION

This invention relates to intumescent putty for use in an opening as a firestop material to deter the spread of flame, smoke, and vapors during a fire.

DESCRIPTION OF THE RELATED ART

Firestop products are used to reduce or eliminate the chimney effect at through-penetrations. Characteristics of firestop materials suitable for typical commercial uses include the ability to expand and to char. Further, the charred material preferably has sufficient strength to withstand a hose stream test.

An industry recognized fire endurance test used to evaluate firestop materials is the American Society of Testing Materials' test identified as "ASTM E-814-83." This test includes subjecting the charred material to a stream of water from a fire hose.

SUMMARY OF THE INVENTION

The present invention provides a non-aqueous, indefinitely conformable, halogen-free, intumescent putty comprising a blend of intumescent material, rubber, and unvulcanized rubber, the rubber and unvulcanized rubber together provide the putty with a softness value of at least 4 mm (preferably, at least 4.5 mm; more preferably at least 5 mm; and even more preferably, at least 6 mm). Further, the putty is essentially free (i.e., contains less than 0.25 percent by weight) of a rubber curing agent.

In another aspect, the present invention provides a non-aqueous, indefinitely conformable, halogen-free, intumescent putty comprising a blend of intumescent material, rubber, and at least 5 percent (preferably, at least 10 percent; more preferably, at least 15 percent) by weight unvulcanized rubber, based on the total weight of the putty. The putty has a softness value of at least 4 mm (preferably, at least 4.5 mm; more preferably at least 5 mm; and even more preferably, at least 6 mm) and is essentially free of a rubber curing agent.

Preferably, the rubber is selected from the group consisting of natural rubber, butyl rubbers, polybutadiene rubbers, synthetic isoprene rubbers, styrene butadiene rubbers, ethylene acrylic rubbers, nitrile rubbers, urethane rubbers, ethylene vinyl acetate rubbers, and combinations thereof. Preferably, the unvulcanized rubber is selected from the group consisting of unvulcanized natural rubber, unvulcanized butyl rubbers, unvulcanized polybutadiene rubbers, unvulcanized synthetic isoprene rubbers, unvulcanized styrene butadiene rubbers, unvulcanized ethylene acrylic rubbers, unvulcanized nitrile rubbers, unvulcanized urethane rubbers, unvulcanized ethylene vinyl acetate rubbers, and combinations thereof.

Optionally, the intumescent putty according to the invention further comprises one or more of a plasticizer, a flame retardant, a char former, a filler, a colorant, a wax, an antioxidant, and/or an antiozonant.

In this application:

"putty" refers to a cohesive, moldable material that does not substantially flow at ambient temperatures (typically temperatures in the range from about 0° C. to about 50° C.);

"indefinitely conformable" means the putty remains soft and handleable for at least one month, (preferably, one year; more preferably, at least five years; even more preferably, at least ten years; and most preferably, at least twenty years) under ambient temperatures (typically temperatures in the range from about 0° C. to about 50° C.);

"halogen-free" means essentially free of halogens (i.e., contains less than 0.25 percent (preferably, less than 0.1 percent; more preferably, less than 0.01 percent) by weight halogen calculated on an elemental basis as Cl, F, etc., based on the total weight of the putty;

"non-aqueous" means essentially free of (i.e., contains less than 0.25 percent by weight) water, other than bound water, wherein bound water is water that does not come off until the material is heated to at least 100° C. (preferably, at least 150° C., more preferably, at least 250° C.);

"intumescent" refers to a material which expands upon heating above about 100° C., although the temperature at which a particular intumescent material intumesces is dependent on the composition of that material;

"intumescent putty" refers to a putty that intumeces to at least two times (preferably at least three times) its (original) unexpanded volume (i.e., its volume prior to intumescing);

"rubber" refers to materials including natural rubber and synthetic rubbers (or synthetic elastomers) that exhibit stretch and recovery after being cured (or vulcanized);

"unvulcanized rubber" refers to the precursor material that when vulcanized (or cured) provides rubber;

"rubber curing agent" refers to a vulcanizing, curing, or crosslinking agent such as sulfur, amines, or difunctional acids, divinyl benzene, or a free radical initiator such as dicumyl peroxide which when compounded and activated with the unvulcanized rubber produces rubber wherein the cure conditions and concentration of agent(s) and/or free radical initiator(s) determine the extent of vulcanization;

"softness value" is a measure of the softness of the putty and is determined as described below under the heading "Softness Value Measurement";

"softness" refers to the ability of the putty to be shaped or molded by hand with ease;

"moldable" means the putty is conformable (e.g., the putty can be wrapped around a pipe);

"cohesion" means that the putty adheres to itself and, once molded, retains its shape until acted upon by an external force;

"adhesion" refers to the ability of the putty to adhere to a dissimilar material (i.e., the putty has sufficient tack to stay in place when molded around construction components (e.g., concrete, dry wall, metal, plastic, and cables)), but not so much tack that it adheres to skin;

"reusable" refers to the ability of the putty installed in one location to be removed and installed in another location, without substantially affecting the intumescence, softness, and flame retardance properties of the putty; and "char strength" is a measure of the strength of the expanded carbonaceous residue ("char") formed from the putty after exposure to temperatures above about 350° C. for about 15 minutes.

Intumescent putties according to the present invention typically are reuseable, exhibit good adhesion properties, and can be used to restore acceptable fire ratings of floors and walls after penetrations (or openings) are made in them. Such penetrations are made, for example, to accommodate the passage of cables, conduits, metal and plastic pipe, and telephone installations. If the penetrations or openings around the installations that pass through the penetrations are not adequately sealed, flame, smoke, and/or water may pass there through and extend the destruction of a fire and/or water damage.

DESCRIPTION OF PREFERRED EMBODIMENTS

The intumescent putty according to the present invention remains in a soft, pliable, and unexpanded condition until it is exposed to heat at temperatures in excess of about 100° C. (212° F.). When heated above about 350° C. (662° F.), the putty readily intumesces typically to about three times its original volume, and begins to form char that further enhances the putty's flame retardant characteristics. The putty seals voids in through-penetrations caused by burning and/or melting materials, effectively preventing the passage of flame, smoke, vapors, and water from one location (e.g., a room or floor) to another.

In another aspect, the putty according to the present invention typically resists flow when subjected to heat. This resistance to flow allows the putty to remain intact at elevated temperatures (i.e., temperatures normally encountered during combustion). If the temperature rises sufficiently (i.e., under the conditions of a fire) the putty may char as well as intumesce.

The general effect of the amounts of materials used to prepare a particular putty according to the present invention on properties such as softness and resistance to flow should be apparent to one skilled in the art after review of the disclosure herein.

Preferably, the putty comprises in the range from about 5 to about 50 percent (preferably, about 15 to about 30 percent) by weight rubber and unvulcanized rubber, based on the total weight of the putty.

In another aspect, the putty preferably comprises in the range from about 10 to about 50 percent (preferably, about 10 to about 25 percent) by weight unvulcanized rubber, based on the total weight of the putty.

In another aspect, the putty preferably comprises in the range from about 1 to about 15 percent (preferably, about 2 to about 8 percent) by weight rubber, based on the total weight of the putty.

The putty can be made by, and is typically made by a method that includes compounding rubber and unvulcanized rubber. Although not wanting to be bound by theory, it is believed that the rubber and the unvulcanized rubber provide a balance between softness and conformability and flow resistance at elevated temperatures.

A preferred rubber is a styrene butadiene rubber, characterized by the manufacturer as having a high degree of crosslinking (commercially available under the trade designation "POLYSAR S1018" from Polysar Rubber Div. of Miles, Inc.). A styrene butadiene rubber, characterized by the manufacturer as having a low Mooney viscosity (commercially available from Ameripol Synpol Co., a Division of Uniroyal Goodrich Tire Co. of Akron, Ohio) is the preferred unvulcanized rubber.

In a preferred embodiment, two types of rubbers are used together with an unvulcanized rubber. The first rubber is preferably a styrene butadiene rubber, characterized by the manufacturer as having a high degree of crosslinking ("POLYSAR S1018"). The amount of this rubber preferably ranges from about 10 to about 40 percent by weight of the total rubber and unvulcanized rubber content of the putty. The second rubber is preferably a butyl rubber characterized by the manufacturer as "moderately" crosslinked" (commercially available under the trade designation "POLYSAR BUTYL XL 68102" from Polysar Rubber Div. of Miles, Inc. of Akron, Ohio). This second rubber is believed to provide a desirable level of stretch. Preferably, the amount of this rubber ranges from about 1 percent by weight to about 5 percent (more preferably, about 1 to about 2 percent) by weight of the total rubber and unvulcanized rubber content of the putty. If the amount of moderately crosslinked rubber is greater than about 5 percent by weight, the material tends to be undesirably tacky, and may be difficult to install in some applications. At levels of less than 1 percent by weight, typically no benefit in stretch is observed from its addition to the formulation.

Suitable intumescent materials include hydrated alkali metal silicates (e.g., sodium silicate, lithium silicate, and potassium silicate with bound water), expandable graphite, unexpanded vermiculite, and organic intumescent compounds such as melamine (i.e., 2, 4, 6-triamino-1, 3, 5-triazine), azocarbonamide, and benzene sulfonyl hydrazide which decompose to give off gases. The amount of intumescent material in the formulation varies depending on the type of intumescent chosen.

The preferred intumescent material is a granular hydrated alkali metal silicate intumescent composition comprising a mixture of bound water; at least one alkali metal silicate having the formula $M_2O:xSiO_2$ (e.g., sodium silicate, lithium silicate, and potassium silicate), wherein M is an alkali metal and x ranges from about 1.5 to about 4, and at least one oxy boron compound selected from the group consisting of boric acid and borate salts of group I and II elements (e.g., metaborate, tetraborate, perborate, polyborate radicals, boric acid, colemanite, calcium metaborate, magnesium borate, and zinc borate) (see, e.g., U.S. Pat. No. 4,521,333 (Graham, et al.), the disclosure of which is incorporated herein by reference).

Preferably, the molar ratio of boron (present in the oxy boron compound) to M is between about 0.2 and about 0.9. The water preferably comprises about 5 to 15 percent by weight of the mixture of water, oxy boron compound(s), and alkali metal silicate(s).

Preferably, the intumescent material is added in particulate form to the rubber and unvulcanized rubber in an amount sufficient to allow the putty to pass the fire test described below under the heading "Flame Through Test," but not so much that it makes the putty non-pliable, or that it adversely affects the char that forms in a fire such that heated putty does not pass the Fire Hose Stream Test described below.

Typically, the amount of intumescent hydrated alkali metal silicate used ranges from about 50 to about 200 percent (preferably about 100 to about 140 percent) by weight of the total rubber and unvulcanized rubber content of the putty. In another aspect, the hydrated alkali metal silicate preferable is present in the range from about 5 to about 45 percent by weight, based on the total weight of the putty.

The hydrated alkali metal silicate particles typically range in size from about 75 micrometers to about 500 micrometers.

A silicate intumescent material is preferably used together with a silicate fluxing agent such as boric oxide. Such fluxing agents are used to stabilize the char formed when the putty is subjected to heat. A preferred silicate fluxing agent is anhydrous boric oxide ($B_2O_3$), commercially available from U.S. Borax of Valencia, Calif. Boric oxide can function as both a flame retardant and a silicate fluxing agent.

If the intumescent material is intercalated graphite, the putty preferably comprises in the range from about 5 to about 30 percent by weight intumescent material, based on the total weight of the putty.

It is within the scope of the present invention to use combinations of intumescent material (e.g., to use both hydrated alkali metal silicate and intercalated graphite).

Preferably, a sufficient amount of plasticizer is included in the putty to obtained the desired level of softness and moldability. Plasticizers are compounds that increase the flexibility of a material and facilitate processing. Suitable plasticizers include aromatic oils, naphthenic oils, mineral oil, waxes, phthalate esters such as dioctyl phthalate (DOP) or dibutyl phthalate, and phosphate esters such as 2-ethylhexyl diphenyl phosphate (commercially available, for example, under the trade designation "SANITIZER 141" from Monsanto of St. Louis, Mo.), isodecyl diphenyl phosphate, or triaryl phosphate ester (commercially available, for example, under the trade designation "SANITIZER 143" from Monsanto). A preferred plasticizer is isobutylene/butene copolymer liquid commercially available under the trade designation "INDOPOL H100" from Amoco Oil Co. of Chicago, Ill.

Suitable waxes include petrolatum (commercially available, for example, under the trade designations "6916 WAX" and "PAXWAX 5324" from National Wax Division of Dussek Campbell, Inc., Skokie, Ill.; "SR-172" from C. P. Hall Co. of Chicago, Ill.; and "PETROLATUM RPB" from Witco Chemical Corp. of New York, N.Y.).

Typically, the plasticizer is present in the range from about 30 to about 50 percent by weight (preferably, from about 35 to about 45 percent by weight, based on the total rubber and unvulcanized rubber content of the putty. In another aspect, the plasticizer typically is present in the range from about 2 to about 25 percent by weight, based on the total weight of the putty.

Other optional ingredients that can be included in the putty formulation include flame retardants, char formers (e.g., char forming resins), fillers, colorants, antioxidants, and antiozonants.

Useful flame retardants include boric oxide; zinc borate; alumina trihydrate; nitrogen phosphates such as ethylene diamine phosphate (commercially available, for example, under the trade designation "AMGUARD EDAP" from Allright & Wilson Ltd. of Richmond, Va.), dimelamine phosphate (commercially available, for example, under the trade designation "AMGUARD ND" from Allright & Wilson Ltd.), melamine phosphate (commercially available, for example, under the trade designation "AMGUARD NH" from Allright & Wilson Ltd.), ammonium pollyphosphate (commercially available, for example, under the trade designations "PHOS CHEK P30" and "PHOS CHEK P40" from Monsanto); and a blend of bis melaminium pentate and polyhedric oxide (commercially available, for example, under the trade designation "CHAR GUARD 329" from Great Lakes Chemical Corp. of West Lafayette, Ind.).

Useful char forming resins include epoxy resins, phenolic resins, polycarboimide resins, urea-formaldehyde resins, and melamine-formaldehyde resins. The general term "phenolic" refers to phenol-formaldehyde resins as well as resins comprising other phenol-derived compounds and formaldehydes. A preferred char forming resin is an epoxy resin commercially available under the trade designation "SCOTCHCAST SR 265" from the 3M Company of St. Paul, Minn.

Fillers can used to adjust the hardness of the putty (i.e., fillers typically make the putty stiffer or harder), act as reinforcement, or reduce cost. Fillers include fumed silica, clay, fly ash, colorants, perlite, vermiculite, inorganic fibers (e.g., glass fibers and mineral fibers), and organic fibers. Melamine, which as discussed above is an organic intumescent material, is also useful as a filler to adjust the tack of the putty. A preferred filler is milled glass fiber (commercially available as "731ED FIBERGLAS" from Owens-Corning Fiberglas Corp. of Toledo, Ohio), or chopped fiberglass fibers (commercially available, for example, under the trade designation "799AB" from Owens-Corning Fiberglas Corp. of Toledo, Ohio).

Colorants (e.g., iron oxide such as $Fe_3O_4$ or $Fe_2O_3$) are useful for product identification.

Antioxidants are compounds added to rubbers to protect the rubber against degradation by oxygen. Such compounds are typically comprised of aromatic amines. Antiozonants may be used to protect the putty from degradation by ozone. Some compounds may perform as antioxidants as well as antiozonants. A preferred antioxidant is thiodiethylene bis-(3,5-di-tert-butyl-4-hydroxy) hydrocinnamate (commercially available under the trade designation "IRGANOX 1035" from the Additives Division of Ciba-Geigy Corp. of Hawthorne, N.Y.).

A preferred antiozonant is a mixture of diaryl p-phenylene diamines (commercially available under the trade designation "WINGSTAY 100" from Goodyear Chemicals Division of Goodyear Tire and Rubber Co. of Akron, Ohio).

The putty can be made by combining the ingredients used to make the putty using conventional techniques known in the art. Typically, the putty is made by mixing the various ingredients using a mogul mixer equipped with circulating cooling water. The cooling water minimizes the build up of heat resulting from exothermic reaction of the ingredients and/or the action of mixing blades, therby preventing the intumescent material from prematurely intumescing.

Preferably, the rubber and unvulcanized rubber are added to the mixing chamber and mixed until thoroughly blended. Any fillers, silicate fluxing agents, char forming resins, waxes, colorants, flame retardant, melamine, antioxidants, and antiozonants are then added while the mixing operation continues. Plasticizer is typically added and then mixed in for a few minutes. The last ingredient added is usually the intumescent material. The putty is typically mixed until homogeneous and smooth (i.e., not lumpy). After mixing, the putty is ready to use.

For many firestop applications, the putty is typically extruded into sheets or pads (usually about 0.635 cm (0.25 inch thick). The sheets or pads are cut to provide the desired size or shape for a particular application. For some applications, the putty is formed into sticks or rope.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

Softness Value Measurement

The softness of the putty is determined using a penetrometer (available as Model 73510 from Precision Instruments of Chicago, Ill.). Measurement of the softness of the putty involves dropping a weighted cone-shaped object into the putty, and then measuring the distance the object penetrates the putty. The test procedure is described in ASTM D-1403-91, which is entitled "Standard Test Methods for Cone Penetration of Lubricating Grease Using One-Quarter and One-Half Scale Cone Equipment" (the disclosure of which is incorporated herein by reference), wherein the penetration measurements were made using a stainless steel, quarter scale cone as specified in the ASTM test method.

Specifically, the softness value of the putty was determined by packing the putty into a tube open at each end such that the putty was flush with both ends of the tube. The packed cylinder was allowed to stand at room temperature (about 23° C.) for a minimum of 12 hours before the softness value was determined.

The cone and the shaft connected thereto weighed 9.38±0.025 grams. An additional 150 grams was added to the top of the shaft. The tip of the cone-shaped object was placed so it just touched the surface of the putty packed into cylinder. For each measurement, the shaft was released and the cone allowed to sink into the putty for 5 seconds. The distance the cone sank into the putty during the 5 seconds was recorded. The softness values reported for Examples 1, 2, and 20 are based on an average of 2 measurements. The softness values reported for Examples 3–19 are based on an average of 10 measurements.

Putty Flow Measurement

Putty was packed into a tube (2.5 cm diameter; 2.5 cm long) open at each end such that it was flush with both ends of the tube. The packed tube was then laid on its curved side in an oven at 200° C. for 30 minutes. The amount of flow that occurred during the 30 minutes of heating was determined visually to be excellent (i.e., no flow), very good (i.e., slight flow), good (i.e., some flow, but material did not flow onto the surface on which the tube was placed in the oven), fair, or very bad (i.e., material flowed freely out of the tube and onto the surface on which the tube was placed in the oven).

Flame Through Test

The Flame Through Test follows the procedure set forth in ASTM (American Society for Testing Materials) Test "E 814-83," entitled "Standard Test Method for Fire Tests of Through-Penetration Fire Stops", incorporated herein by reference. This test is used to evaluate the use of putty in a through-penetration fire application.

For this test, a poured concrete slab, 11.4 cm (4.5 in) thick and approximately 30.5 cm (3 ft) square, was prepared. Four 10.2 cm (4 in) diameter circular openings were made in the slab. The openings were evenly spaced. A 2.5 cm (1 in)) thick mineral fiber insulation material (commercially available under the trade designation "USG #4 FIRE SAFING" from U.S. Gypsum of Chicago, Ill.) was firmly packed into each opening in the slab. The mineral fiber was recessed about 2.5 cm from the top surface of the concrete. The putty was packed into the opening flush with the top surface of the concrete. The thickness of the putty was about 2.5 cm. The concrete slab was placed on the top of a gas-fired furnace (commercially available from Armil C.F.S. of South Holland, Ill.). The mineral fibers faced the heat source (flame) of the furnace.

The time and temperature parameters outlined in FIG. 1 of ASTM E 814-83 were followed for the test. The test was run for 3 hours, unless flame through occurred. Flame through is indicated by flames coming through the opening to the "cold" side of the concrete slab. If there is flame through in less than 3 hours, then the material tested is deemed to have failed the test. If the opening remained sealed for the 3 hours, then the fire stop is given a passing designation (referred in ASTM E 814-83 as having an "F" rating).

Fire Hose Stream Test

If a fire stop employing the putty of one of the examples passed the "Flame Through Test," then the following test, which is described in ASTM E 814-83, was conducted.

Immediately after the "Flame Through Test," the slab was removed from the furnace and placed vertically in a metal stand. From a distance of 6.1 meters (20 ft), a stream of water was propelled in a sweeping motion against the material in the opening of the concrete slab at a pressure of 0.21 MPa (30 lbs/in2). To pass this test, the material sealing the through-penetration, after having been subjected to the heat from a fire thus producing a char, had to withstand the hose stream and continue to seal the pipe for a period of 1.5 seconds per 0.09 square meter (i.e., 1.5 seconds per square foot) of test structure. For example, a 0.84 $m^2$ (9 $ft^2$) assembly must withstand a hose stream for 13.5 seconds.

The ingredients used for the examples are listed in Table 1, below.

TABLE 1

| Ingredient | Trade Designation | Source of Ingredient |
|---|---|---|
| Unvulcanized styrene butadiene rubber | "AMERIPOL SYNPOL 8107" | Ameripol Synpol Co. Division of Uniroyal Goodrich Tire Co., Akron, OH |
| Styrene butadiene rubber | "POLYBAR S 1018" | Polysar Rubber Division of Miles, Pittsburgh, PA |
| Moderately crosslinked butyl rubber | "POLYSAR BUTYL XL 68102" | Polysar Rubber Division of Miles, Pittsburgh, PA |
| Mixture of diaryl p-phenylene diamine | "WINGSTAY 100" | Goodyear Chemicals Division of Goodyear Tire and Rubber Co., Akron, OH |
| Thiodiethylene bis-(3,5-di-tert-butyl-4-hydroxy) hydrocinnamate | "IRGANOX 1035" | Additives Division of Ciba-Geigy Corp., Hawthorne, NY |
| Fumed silica | "CAB-O-SIL M-5" | Cabot Corp., Tuscola, IL |
| Epoxy resin powder | "SCOTCHCAST SR-265" | The 3M Company, St. Paul, MN |
| Powdered iron oxide ($Fe_2O_3$) | "IRON OXIDE BF-95" | Bailey Engineers, Inc., Fairfield, AL |
| Boron trioxide powder | "ANHYDROUS BORIC ACID" | U.S. Borax, Valencia, CA |
| Melamine powder (−60 mesh) | "AERO MELAMINE" | Cytec Industries, West Peterson, NJ |
| Milled glass filaments | "731ED FIBERGLASS ⅛"" | Owens-Corning, Fiberglas Corp., Toledo, OH |

TABLE 1-continued

| Ingredient | Trade Designation | Source of Ingredient |
|---|---|---|
| Milled glass filaments | "MFX-⅛ IN" | Phoenix Fiberglas, Inc., Oakville, Ontario, Canada |
| Chopped fiberglass fibers, 1.25 cm (0.5 inch) long | "799AB" | Owens-Corning Fiberglas Corp., Toledo, OH |
| Isobutylene butene copolymer liquid | "INDOPOL H-100" | Amoco Chemical Co., Chicago, IL |
| Copolymer of isobutyl and isoprene | "POLYSAR BLITYL 301" | Polysar Rubber Division of Miles |
| Petrolatum | "6916 WAZ" | National Wax Division of Dussek Campbell, Inc., Skokie, IL |
| Petrolatum | "PAXWAX 5324" | National Wax Division of Dussek Campbell, Inc. |
| Petrolatum | "PENROCO AMBER" | Penreco zproducts C., Penreco Division, Karns City, PA |
| Petrolatum | "PETROLATUM RPB" | Witco Chemical Corp., New York, NY |
| Blend of bis melaminium pentate and polyhedric oxide (flame retardant) | "CHARGUARD 329" | Great Lakes Chemical Corp., West Lafayette, IN |
| Intercalated graphite flake | "GRAPHITE TG 326" | UCAR Carbon Co., Inc., Danbury, CT |
| Granulated hydrated sodium silicate | "EXPANTROL 4BW" | The 3M Company |
| Granulated hydrated sodium silicate | "EXPANTROL 2" | The 3M Company |
| Hydrated zinc borate | "FIREBRAKE ZB FINE" | U.S. Borax |

EXAMPLES 1 and 2

The ingredients for Examples 1 and 2 are listed in Table 2, below.

TABLE 2

| Ingredient | Amount of Ingredients, PHR* | |
|---|---|---|
| | Example 1 | Example 2 |
| Unvulcanized styrene butadiene rubber ("AMERIPOL SYNPOL 8107") | 76.50 | 76.50 |
| Styrene butadiene rubber ("POLYBAR S 1018") | 20.00 | 20.00 |
| Moderately crosslinked butyl rubber ("POLYBAR XL 68102") | 3.50 | 3.50 |
| Mixture of diaryl p-phenylene diamine ("WINGSTAY 100") | 2.00 | 2.00 |
| Thiodiethylene bis-(3,5-di-tert-butyl-4-hydroxy) hydrocinnamate ("IRGANOX 1035") | 2.00 | 2.00 |
| Fumed silica ("CAB-O-SIL M 5") | 13.00 | 13.00 |
| Epoxy resin powder ("SCOTCHCAST SR 265") | 15.00 | 15.00 |
| Powdered iron oxide ($Fe_2O_3$) | 5.00 | 5.00 |
| ("IRON OXIDE BF 95") Melamine powder ("AERO MELAMINE") | 50.00 | 75.00 |
| Boron Oxide (Anhydrous) | 40.00 | 40.00 |
| Milled glass filaments ("731ED FIBERGLASS") | 30.00 | 30.00 |
| Isobutylene butene copolymer liquid ("INDOPOL H 100") | 40.00 | 50.00 |
| Petrolatum ("6916 WAX") | 60.00 | 60.00 |
| Granulated hydrated sodium silicate ("EXPANTROL 4BW") | 120.00 | |
| Intercalated graphite flake ("GRAPHITE TG 326") | | 70.00 |

*Parts per hundred based on the total rubber and unvulcanized rubber content of the putty.

The ingredients for each example were compounded using an internal mixer (Prep Mixer, Part #02-22-000, 350/420 cm³ capacity; available from C. W. Brabender Instruments, Inc. of South Hackensack, N.J.) equipped with sigma mixing blades. The mixer was powered by a Plasticorder, Model DR-2071, electronic torque rheometer with a Model FE-2000 interface (each of which are available from C. W. Brabender Instruments, Inc.).

The unvulcanized rubber ("Ameripol Synpol 8107") and rubbers ("Polysar S 1018" and "POLYSAR BUTYL XL 68102") were added to the mixing chamber of the mixer and then blended for about 6 minutes at about 60 rpm. The speed of the mixing blades was then reduced to 40 rpm, and the antioxidant (i.e., thiodiethylene bis-(3,5-di-tert-butyl-4-hydroxy) hydrocinnamate), antiozonant (i.e., mixture of diaryl p-phenylene diamine), fumed silica, epoxy resin, iron oxide, boric oxide, melamine, and milled glass fibers were added while mixing continued. The ingredients were mixed for about 3 minutes, after which the mixing speed was increased to about 60 rpm. The plasticizer ("INDOPOL H-100") was then added, and mixing continued for about 13 minutes. The petrolatum was then slowly added and mixed in for about 5 minutes. Finally, the hydrated sodium silicate was added and mixed in for about 5 minutes. The batch sizes for Examples 1 and 2 were about 477 grams and about 462 grams, respectively.

The softness value of the putty was determined as described above under the heading "Softness Value Measurement." The softness value of both Examples 1 and 2 was 5.5 mm.

The char strength and expansion ratio (i.e., the char volume divided by the initial volume) of each example was determined as follows. First, a portion of each putty was pressed to a thickness of about 0.635 cm (¼"). Next, a 2.5 cm (1 inch) diameter disc was die cut from each (pressed) sheet.

The initial volume of each disc was determined by weighing the disc, coating the disc with wax by dipping it in molten paraffin wax, submerging and weighing the (coated) disc in deionized water, and then calculating the volume using the following equation:

$$\text{volume} = \frac{\text{dry weight} - \text{submerged weight}}{\text{density of water}} \quad \text{(Equation 1)}$$

The disc was then placed in a muffle furnace at about 350° C. for about 15 minutes to intumesce and char. The resulting charred, expanded disc was then weighed, coated with wax, and then submerged and weighed in deionized water. The volume of the charred, expanded disc was calculated using Equation 1 (above).

The expansion ratio was calculated using the following equation:

$$\text{volume} = \frac{\text{volume of charred, expanded disc}}{\text{volume of initial (uncharred) disc}} \quad \text{(Equation 2)}$$

The expansion ratios of Examples 1 and 2, based on an average of two determinations, were 2.84 and 5.22, respectively. The flow characteristics of the Example 1 and 2 putties were both excellent.

Examples 1 and 2 passed both the "Flame Through Test" and the "Fire Hose Stream Test."

EXAMPLES 3–10

The ingredients for Examples 3–10 are listed in Table 3, below.

TABLE 3

| Ingredient | Amount of ingredients, PHR | | | | | | | |
|---|---|---|---|---|---|---|---|---|
| | Ex. 3 | Ex. 4 | Ex. 5 | Ex. 6 | Ex. 7 | Ex. 8 | Ex. 9 | Ex. 10 |
| Unvulcanized styrene butadiene rubber ("AMERIPOL SYNPOL 8107") | 46.50 | 61.50 | 66.50 | 71.50 | 76.50 | 81.50 | 86.50 | 91.50 |
| Styrene butadiene rubber ("POLYBAR S 1018") | 50.00 | 35.00 | 30.00 | 25.00 | 20.00 | 15.00 | 10.00 | 5.00 |
| Moderately crosslinked butyl rubber ("POLYSAR XL 68102") | 3.50 | 3.50 | 3.50 | 3.50 | 3.50 | 3.50 | 3.50 | 3.50 |
| Mixture of diaryl p-phenylene diamine ("WINGSTAY 100") | 2.00 | 2.00 | 2.00 | 2.00 | 2.00 | 2.00 | 2.00 | 2.00 |
| Thiodiethylene bis-(3,5-di-tert-butyl-4-hydroxy) hydrocinnamate ("IRGANOX 1035") | 2.00 | 2.00 | 2.00 | 2.00 | 2.00 | 2.00 | 2.00 | 2.00 |
| Fumed silica ("CAB-O-SIL M 5") | 13.00 | 13.00 | 13.00 | 13.00 | 13.00 | 13.00 | 13.00 | 13.00 |
| Epoxy resin powder ("SCOTCHCAST SR 265") | 15.00 | 15.00 | 15.00 | 15.00 | 15.00 | 15.00 | 15.00 | 15.00 |
| Powdered iron oxide ($Fe_2O_3$) ("IRON OXIDE BF 95") | 5.00 | 5.00 | 5.00 | 5.00 | 5.00 | 5.00 | 5.00 | 5.00 |
| Melamine powder ("AERO MELAMINE") | 50.00 | 50.00 | 50.00 | 50.00 | 50.00 | 50.00 | 50.00 | 50.00 |
| Boron oxide (Anhydrous) | 40.00 | 40.00 | 40.00 | 40.00 | 40.00 | 40.00 | 40.00 | 40.00 |
| Milled glass filaments ("731ED FIBERGLASS") | 30.00 | 30.00 | 30.00 | 30.00 | 30.00 | 30.00 | 30.00 | 30.00 |
| Isobutylene butene copolymer liquid ("INDOPOL H 100") | 40.00 | 40.00 | 40.00 | 40.00 | 40.00 | 40.00 | 40.00 | 40.00 |
| Petrolatum ("PAXWAX 5324") | 60.00 | 60.00 | 60.00 | 60.00 | 60.00 | 60.00 | 60.00 | 60.00 |
| Granulated hydrated sodium silicate ("EXPANTROL 4BW") | 120.00 | 120.00 | 120.00 | 120.00 | 120.00 | 120.00 | 120.00 | 120.00 |

Examples 3–10 were prepared as described for Examples 1 and 2. The batch size of each example was about 477 grams.

The expansion ratio of Examples 3–10 were determined (as described in Examples 1 and 2) to be 3.06, 2.96, 3.05, 2.96, 3.02, 3.00, 3.07, and 3.10, respectfully. The softness values of the Example 3–10 putties were determined as described above under the heading "Softness Value Measurement." The softness values for Examples 3–10 were 5.6 mm, 5.7 mm, 5.6 mm, 5.8 mm, 6.0 mm, 5.8 mm, 5.9 mm, and 5.9 mm. The flow characteristic of the Examples 3–10 putties were excellent, excellent, excellent, excellent, very good, very good, good, and fair, respectively.

EXAMPLES 11–14

The ingredients for Examples 11–14 are listed in Table 4, below.

TABLE 4

| Ingredient | Amount of ingredients, PHR | | | |
|---|---|---|---|---|
| | Ex. 11 | Ex. 12 | Ex. 13 | Ex. 14 |
| Unvulcanized styrene butadiene ("AMERIPOL SYNPOL 8107") | 76.50 | 76.50 | 76.50 | 76.50 |
| Styrene butadiene rubber ("POLYBAR S 1018") | 20.00 | 20.00 | 20.00 | 20.00 |
| Moderately crosslinked butyl rubber ("POLYBAR XL 68102") | 3.50 | 3.50 | 3.50 | 3.50 |
| Mixture of diaryl p-phenylene diamine ("WINGSTAY 100") | 2.00 | 2.00 | 2.00 | 2.00 |
| Thiodiethylene bis-(3,5-di-tert-butyl-4-hydroxy) hydrocinnamate ("IRGANOX 1035") | 2.00 | 2.00 | 2.00 | 2.00 |
| Fumed silica ("CAB-O-SIL M 5") | 13.00 | 13.00 | 13.00 | 13.00 |
| Epoxy resin powder ("SCOTCHCAST SR 265") | 15.00 | 15.00 | 15.00 | 15.00 |
| Powdered iron oxide ($Fe_2O_3$) ("IRON OXIDE BF 95") | 5.00 | 5.00 | 5.00 | 5.00 |
| Melamine powder ("AERO MELAMINE") | 50.00 | 50.00 | 50.00 | 50.00 |
| Boron Oxide (anhydrous) | 40.00 | | | |
| Hydrated Zinc Borate ("FIREBRAKE ZB FINE") | | 40.00 | | 83.25 |
| Milled glass filaments ("731ED FIBERGLASS") | 30.00 | 30.00 | 30.00 | 30.00 |
| Isobutylene butene copolymer liquid ("INDOPOL H 100") | 40.00 | 40.00 | 40.00 | 40.00 |
| Petrolatum ("PAXWAX 5324") | 60.00 | 60.00 | 60.00 | 60.00 |
| Granulated hydrated sodium silicate ("EXPANTROL 4BW") | 120.00 | 120.00 | 120.00 | 120.00 |

Examples 11–14 were prepared by blending the styrene butadiene rubbers ("POLYSAR S 1018" and "POLYSAR XL 68102"), and about 4.35% of the unvulcanized styrene butadiene rubber ("AMERIPOL SYNPOL 8107") on a 40.6 cm (16 inch) rubber mill, and then mixing for about 30 minutes at about 20 rpm. About 3.75% of the plasticizer ("INDOPOL H-100") was then added to the rubber/unvulcanized rubber mixture while milling continued.

The resulting "prebatch" was removed from the rubber mill and charged into a mogul mixer (No. 59821; available from APV Chemical Machinery Inc. of Saginaw, Mich.) along witch the balance of the unvulcanized styrene butadiene rubber("AMERIPOL SYNPOL 8107"),and then mixed for about 2 minutes.

While mixing continued, antioxidant (i.e., thiodiethylene bis-(3, 5-di-tert-butyl-4-hydroxy) hydrocinnamate), antiozonant (i.e., the mixture of diaryl p-phenylene diamine), fumed silica, epoxy resin, iron oxide, boron oxide (if in the formulation), zinc borate (if in the formulation), melamine, and milled glass fibers were added to the mixer over a 10 minute period. Plasticizer ("INDOPOL H-100") was then added and mixed in for about 5 minutes. Next, hydrated sodium silicate ("EXPANTROL 4BW") was added and mixed in for about 5 minutes. Finally, the petrolatum ("PAXWAX 5324") was added and mixed in for about 10 minutes, until the putty was smooth. The batch sizes of Examples 11–14 were about 1.35 kg, about 1.35 kg, about 1.24 kg, and about 1.47 kg, respectively.

The expansion ratio of Examples 11–14 were determined (as described in Examples 1 and 2) to be 2.77, 2.77, 3.20, and 2.64, respectively. The softness values of the Example 11–14 putties were determined as described above under the heading "Softness Value Measurement." The softness values for Examples 11–14 were 5.4 mm, 5.5 mm, 5.5 mm, and 5.10 mm, respectfully. The flow characteristic of the Examples 11–14 putties were excellent;, good, good, and very good.

The "Flame Through Test" and the "Hose Stream Test" were run on four samples of each lot. All four samples for Examples 11, 13, and 14 passed the "Flame Through Test." Only two of the four Example 12 samples, however, passed the "Flame Through Test." For the "Hose Stream Test," four of the Example 11 samples passed, one of the Example 12 samples passed, none of the Example 13 samples passed, and three of the Example 14 samples passed.

EXAMPLES 15–19

The ingredients for Examples 15–19 are listed in Table 5, below.

TABLE 5

| Ingredient | Amount of ingredients, PHR | | | | |
|---|---|---|---|---|---|
| | Ex. 15 | Ex. 16 | Ex. 17 | Ex. 18 | Ex. 19 |
| Unvulcanized styrene butadiene rubber ("AMERIPOL SYNPOL 8107") | 76.50 | 76.50 | 76.50 | 76.50 | 76.50 |
| Styrene butadiene rubber ("POLYBAR S 1018") | 20.00 | 20.00 | 20.00 | 20.00 | 20.00 |
| Moderately crosslinked butyl rubber ("POLYBAR XL 68102") | 3.50 | 3.50 | 3.50 | 3.50 | 3.50 |
| Mixture of diaryl p-phenylene diamine ("WINGSTAY 100") | 2.00 | 2.00 | 2.00 | 2.00 | 2.00 |
| Thiodiethylene bis-(3,5-di-tert-butyl-4-hydroxy) hydrocinnamate ("IRGANOX 1035") | 2.00 | 2.00 | 2.00 | 2.00 | 2.00 |
| Fumed silica ("CAB-O-SIL M 5") | 13.00 | 13.00 | 13.00 | 13.00 | 13.00 |
| Epoxy resin powder ("SCOTCHCAST SR 265") | 15.00 | 15.00 | 15.00 | 15.00 | 15.00 |
| Powdered iron oxide ($Fe_2O_3$) ("IRON OXIDE BF 95") | 5.00 | 5.00 | 5.00 | 5.00 | 5.00 |
| Melamine powder ("AERO MELAMINE") | 50.00 | 50.00 | 50.00 | 50.00 | 50.00 |
| Boron Oxide (anhydrous) | 40.00 | 40.00 | 40.00 | 40.00 | 40.00 |
| Milled glass filaments ("731ED FIBERGLASS") | 30.00 | 30.00 | 30.00 | 30.00 | 30.00 |
| Isobutylene butene copolymer liquid ("INDOPOL H 100") | 55.00 | 50.00 | 40.00 | 30.00 | 25.00 |
| Petrolatum | 60.00 | 60.00 | 60.00 | 60.00 | 60.00 |

TABLE 5-continued

| | Amount of ingredients, PHR | | | | |
|---|---|---|---|---|---|
| Ingredient | Ex. 15 | Ex. 16 | Ex. 17 | Ex. 18 | Ex. 19 |
| ("PAXWAX 5324") Granulated hydrated sodium silicate ("EXPANTROL 4BW") | 120.00 | 120.00 | 120.00 | 120.00 | 120.00 |

Examples 15–19 were prepared as described for Examples 1 and 2. The batch size for Examples 15, 16, 17, 18, and 19, was about 492 grams, about 487 grams, about 477 grams, about 467 grams, and about 462 grams, respectively.

The expansion ratio of Examples 15, 16, 17, 18, and 19 were determined (as described in Examples 1 and 2) to be 2.97, 2.93, 3.02, 2.97, and 2.93, respectively. The softness values of the Example 3–10 putties were determined as described above under the heading "Softness Value Measurement." The softness values for Examples 15, 16, 17, 18, and 19 were 6.1 mm, 5.9 mm, 6.0 mm, 5.4 mm, and 5.1 mm, respectfully. The flow characteristic of the Examples 15, 16, 17, 18, and 19 putties were fair, good, very good, very good, and very good, respectively.

The following observations were made when handling each of Examples 15–19. Example 15 was very tacky and left residue on the skin. Example 16 was tacky and left some residue on the skin. Examples 17, 18, and 19 all had a good level of tackiness and left no visible residue on the skin.

EXAMPLE 20

The ingredients for Example 20 are listed in Table 6, below.

TABLE 6

| Ingredient | Amount of ingredients, PHR Example 20 |
|---|---|
| Non-crosslinked styrene butadiene rubber ("AMERIPOL SYNPOL 8107") | 80.00 |
| Cross-linked styrene butadiene rubber ("POLYBAR S 1018") | 20.00 |
| Fumed silica ("CAB-O-SIL M-5") | 13.00 |
| Epoxy-resin powder ("SCOTCHCAST SR 265") | 15.00 |
| Powdered iron oxide ($Fe_2O_3$) ("IRON OXIDE BF 95") | 5.00 |
| Hydrated zinc borate ("FIREBRAKE ZB FINE") | 50.00 |
| Chopped fiberglass fibers ("799AB") | 20.06 |
| Isobutylene butene copolymer liquid ("INDOPOL H 100") | 71.00 |
| Blend of bis melaminium pentate and polyhedric oxide ("CHARGUARD 329") | 15.00 |
| Petrolatum ("PETROLATUM RPB") | 50.00 |
| Granulated hydrated sodium silicate ("EXPANTROL 2") | 100.00 |

Example 20 was prepared as described for Examples 1 and 2. The batch size was about 439 grams.

The expansion ratio of Example 20 was determined (as described in Examples 1 and 2) to be 7.05. The softness value was determined as described above under the heading "Softness Value Measurement" to be 5.6 mm. The flow characteristic of the putty was good.

Example 20 passed both the "Flame Through Test" and the "Fire Hose Stream Test."

EXAMPLE 21

The ingredients for Example 21 are listed in Table 7, below.

TABLE 7

| Ingredient | Amount of Ingredients PHR* Example 21 |
|---|---|
| Unvulcanized styrene butadiene rubber ("AMERIPOL SYNPOL 8107") | 74.02 |
| Styrene butadiene rubber ("Polysar S 1018") | 22.11 |
| Moderately crosslinked butyl rubber (POLYBAR XL 68102") | 3.87 |
| Thiodiethylene bis-(3,5-di-tert-butyl-4-hydroxy) hydrocinnamate ("IRGANOX 1035") | 3.32 |
| Fumed silica ("CAB-O-SIL") | 14.37 |
| Epoxy resin powder ("SCOTCHCAST 265") | 16.59 |
| Powdered iron oxide ($Fe_2O_3$) ("IRON OXIDE BF-1") | 5.53 |
| Melamine powder ("AERO MELAMINE") | 55.29 |
| Boron Oxide Anhydrous ("BORIC OXIDE 60 MESH) | 44.23 |
| Milled filaments ("MFX-⅛ IN") | 33.17 |
| Isobutylene butene copolymer liquid ("INDOPOL H 100") | 44.23 |
| Petrolatum ("PENRECO AMBER") | 66.34 |
| Granulated hydrated sodium silicate ("EXPANTROL 4BW") | 132.68 |

*Parts per hundred based on the total rubber and unvulcanized rubber content of the putty.

The ingredients were compounded using the internal mixer described in Example 1.

The unvulcanized rubber ("Ameripol Synpol 8107") and rubbers ("Polysar S 1018" and "POLYSAR BUTYL XL 68102") were added to the mixing chamber of the mixer and then blended for about 6 minutes at about 60 rpm. The speed of the mixing blades was then reduced to 40 rpm, and the antioxidant (i.e., thiodiethylene bis-(3, 5-di-tert-butyl-4-hydroxy) hydrocinnamate), fumed silica, epoxy resin, iron oxide, boric oxide, melamine, and milled glass fibers were added while mixing continued. The ingredients were mixed for about 3 minutes, after which the mixing speed was increased to about 60 rpm. The plasticizer ("INDOPOL H-100") was then added, and mixing continued for about 13 minutes. The petrolatum was then slowly added and mixed in for about 5 minutes. Finally, the hydrated sodium silicate was added and mixed in for about 5 minutes. The batch size was about 466.44 grams.

The softness value of the putty, as determined using the method described above under the heading "Softness Value Measurement" was 6.32 mm. The expansion ratio of Example 21, based on an average of two determinations, was 2.76. The flow characteristic of the putty was excellent. Further, the "Flame Through Test" and the "Fire Hose Stream Test."

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An indefinitely conformable, intumescent putty comprising a blend of intumescent material, rubber, and unvulcanized rubber, said rubber and said unvulcanized rubber together providing said putty with a softness value of at least 4 mm, said putty containing less than 0.25 percent by weight halogen, said putty containing less than 0.25 percent by weight water other than bound water, wherein bound water is water that does not come off until the putty is heated to at least 100° C., and said putty containing less than 0.25 percent by weight rubber curing agent, based on the total weight of the putty.

2. The putty according to claim 1 wherein said bound water is water that does not come off until the putty is heated to at least 150° C.

3. The putty according to claim 1 wherein said bound water is water that does not come off until the putty is heated to at least 250° C.

4. The putty according to claim 3 wherein said rubber is selected from the group consisting of natural rubber, butyl rubbers, polybutadiene rubbers, synthetic isoprene rubbers, styrene butadiene rubbers, ethylene acrylic rubbers, nitrile rubbers, urethane rubbers, ethylene vinyl acetate rubbers, and combinations thereof, and said unvulcanized rubber is selected from the group consisting of unvulcanized natural rubber, unvulcanized butyl rubbers, unvulcanized polybutadiene rubbers, unvulcanized synthetic isoprene rubbers, unvulcanized styrene butadiene rubbers, unvulcanized ethylene acrylic rubbers, unvulcanized nitrile rubbers, unvulcanized urethane rubbers, unvulcanized ethylene vinyl acetate rubbers, and combinations thereof.

5. The putty according to claim 4 wherein said putty comprises about 10 to about 50 percent by weight of said unvulcanized rubber, based on the total weight of said putty.

6. The putty according to claim 5 wherein said putty comprises about 50 to about 200 percent by weight of said intumescent material, based on the total rubber and unvulcanized rubber content of said putty.

7. The putty according to claim 4 wherein said putty further comprises a plasticizer, a char forming resin, a filler, and at least one of an antioxidant or an antiozonant.

8. The putty according to claim 4 wherein said putty further comprises a flame retardant, a plasticizer, a char forming resin, a filler, and at least one of an antioxidant or an antiozonant.

9. The putty according to claim 8 wherein said flame retardant is boric oxide.

10. The putty according to claim 4 wherein said putty having a softness value of at least 4.5 mm.

11. The putty according to claim 4 wherein said putty having a softness value of at least 5 mm.

12. The putty according to claim 4 wherein said putty having a softness value of at least 6 mm.

13. The putty according to claim 4 wherein said intumescent material is hydrated sodium silicate, and said putty further comprises a silicate fluxing agent.

14. The putty according to claim 4 wherein said intumescent material includes graphite.

15. The putty according to claim 3 wherein said unvulcanized rubber is styrene butadiene rubber.

16. An indefinitely conformable intumescent putty comprising a blend of intumescent material, rubber, and at least 5 percent by weight unvulcanized rubber, based on the total weight of the putty, said putty having a softness value of at least 4 mm, said putty containing less than 0.25 percent by weight halogen, said putty containing less than 0.25 percent by weight water other than bound water, wherein bound water is water that does not come off until the putty is heated to at least 100° C. and said putty containing less than 0.25 percent by weight rubber curing agent, based on the total weight of the putty.

17. The putty according to claim 16 wherein said bound water is water that does not come off until the putty is heated to at least 150° C.

18. The putty according to claim 16 wherein said bound water is water that does not come off until the putty is heated to at least 250° C.

19. An indefinitely conformable intumescent putty comprising a blend of intumescent material, rubber, and at least 10 percent by weight unvulcanized rubber, based on the total weight of the putty, said putty having a softness value of at least 4 mm, said putty containing less than 0.25 percent by weight halogen, said putty containing less than 0.25 percent by weight water other than bound water, wherein bound water is water that does not come off until the putty is heated to at least 100° C. and said putty containing less than 0.25 percent by weight rubber curing agent, based on the total weight of the putty.

20. The putty according to claim 19 wherein said bound water is water that does not come off until the putty is heated to at least 150° C.

21. The putty according to claim 19 wherein said bound water is water that does not come off until the putty is heated to at least 250° C.

22. The putty according to claim 21 wherein said rubber is selected from the group consisting of natural rubber, butyl rubbers, polybutadiene rubbers, synthetic isoprene rubbers, styrene butadiene rubbers, ethylene acrylic rubbers, nitrile rubbers, urethane rubbers, ethylene vinyl acetate rubbers, and combinations thereof, and said unvulcanized rubber is selected from the group consisting of unvulcanized natural rubber, unvulcanized butyl rubbers, unvulcanized polybutadiene rubbers, unvulcanized synthetic isoprene rubbers, unvulcanized styrene butadiene rubbers, unvulcanized ethylene acrylic rubbers, unvulcanized nitrile rubbers, unvulcanized urethane rubbers, unvulcanized ethylene vinyl acetate rubbers, and combinations thereof.

23. The putty according to claim 22 wherein said putty having a softness value of at least 4.5 mm.

24. The putty according to claim 22 wherein said putty further comprises a plasticizer, a char forming resin, a filler, and at least one of an antioxidant or an antiozonant.

25. The putty according to claim 22 wherein said putty further comprises a flame retardant, a plasticizer, a char forming resin, a filler, and at least one of an antioxidant or an antiozonant.

26. The putty according to claim 25 wherein said flame retardant is boric oxide.

27. The putty according to claim 22 wherein said putty having a softness value of at least 5 mm.

28. The putty according to claim 22 wherein said intumescent material is hydrated sodium silicate, and said putty further comprises a silicate fluxing agent.

29. The putty according to claim 22 wherein said putty having a softness value of at least 6 mm.

30. The putty according to claim 21 wherein said unvulcanized rubber is styrene butadiene rubber.

* * * * *